July 11, 1961
D. CLEJAN
2,991,731
LANDING GEAR FOR SEMI-TRAILER TRUCKS
Filed April 12, 1955
2 Sheets-Sheet 1
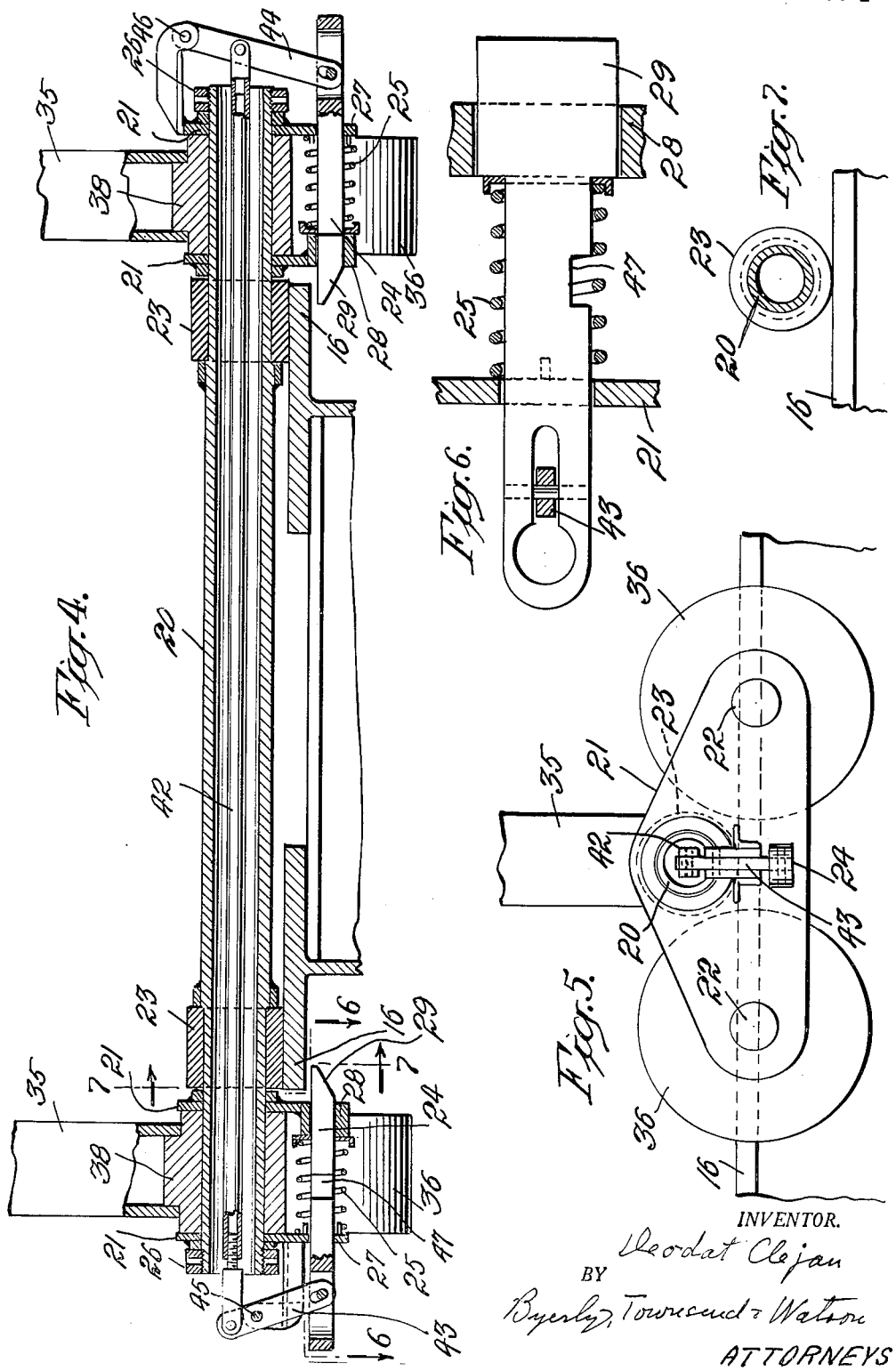
INVENTOR.
Deodat Clejan
BY
Byerly, Townsend & Watson
ATTORNEYS July 11, 1961
D. CLEJAN
2,991,731
LANDING GEAR FOR SEMI-TRAILER TRUCKS
Filed April 12, 1955
2 Sheets-Sheet 2
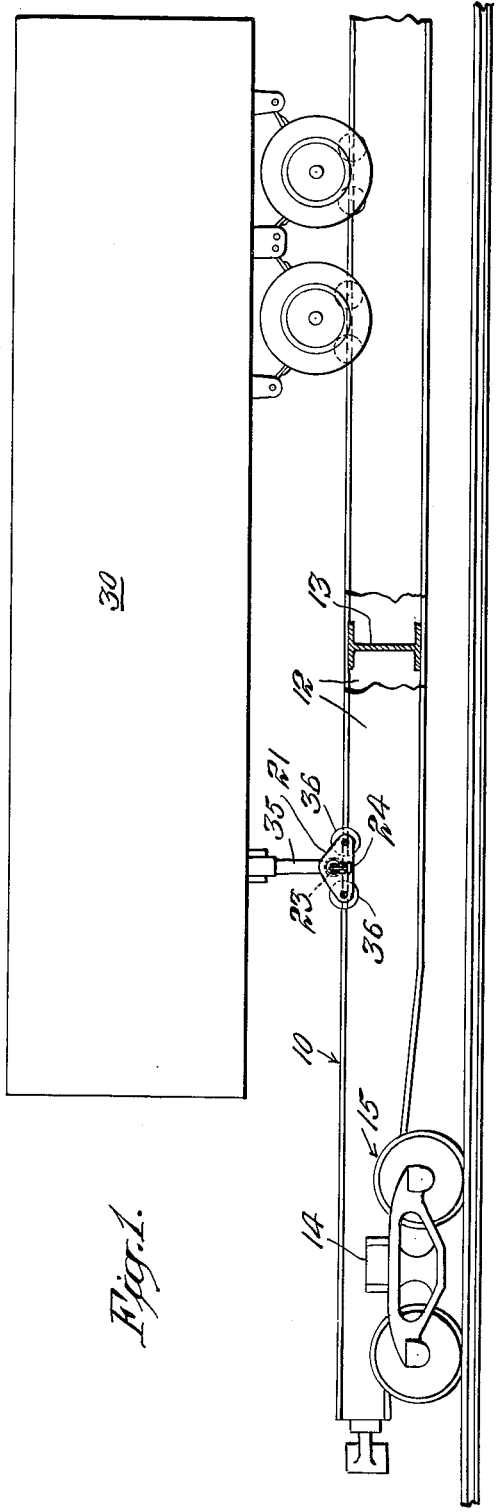
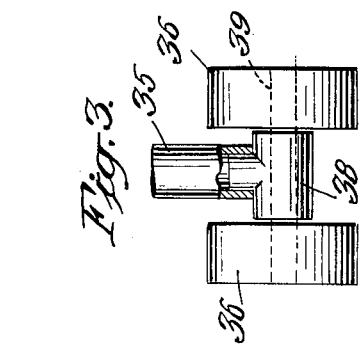
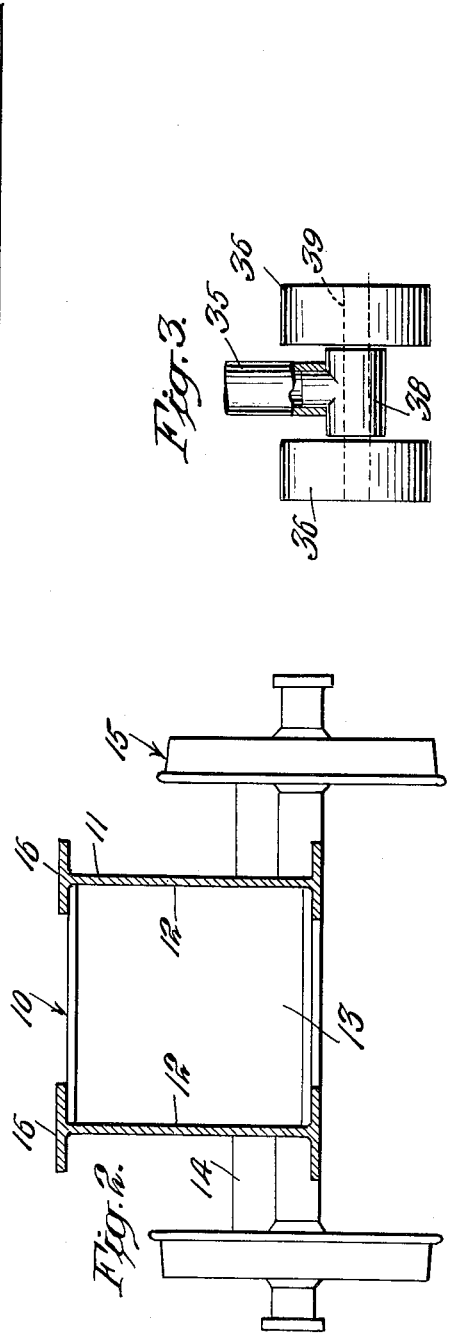
INVENTOR.
DEODAT CLEJAN
BY
Byerly Townsend Watson
ATTORNEYS

United States Patent Office 2,991,731
Patented July 11, 1961

1

2,991,731
LANDING GEAR FOR SEMI-TRAILER TRUCKS
Deodat Clejan, New York, N.Y., assignor, by mesne assignments, to General American Transportation Corporation, Chicago, Ill., a New York corporation
Filed Apr. 12, 1955, Ser. No. 500,807
9 Claims. (Cl. 105—368)

This invention relates to a landing gear for semi-trailer trucks which are to be used in a rail-and-road transportation system.

Objects of the invention are to provide a landing gear capable of supporting one end of the trailer either on a road or on rails provided at the sides of the frame of a railway car.

A further object is to provide automatic means for preventing the wheels of the landing gear from jumping off the rails on a railway car.

In order to indicate the way these and other objects are achieved, I will describe in detail a specific embodiment of the invention which is shown in the accompanying drawings, in which FIG. 1 is a side view of part of a railway unit consisting of a trailer mounted on a railway car;

FIG. 2 is a transverse section of the railway car showing the construction of its frame which provides a track;

FIG. 3 is a side view, partially in section, of the lower end of one of the legs of a landing gear commonly used on semi-trailers;

FIG. 4 is a fragmentary transverse section of a railway unit consisting of a trailer mounted on a railway car showing the upper part of the frame of a railway car and the lower part of the landing gear of a trailer;

FIG. 5 is an end view of the parts shown in FIG. 4 looking at the left-hand end of FIG. 4;

FIG. 6 is a detailed horizontal section on the line 6—6 of FIG. 4; and

FIG. 7 is a detailed vertical section on the line 7—7 of FIG. 4.

Referring now to FIG. 1 of the drawings, there is shown a rail-and-road transportation system comprising a railway skeleton car 10 and a semi-trailer truck 30.

The railway car 10 has a long narrow box-like frame 11 consisting of two long I-beams 12 secured together by cross-braces 13 in the form of short I-beams. The ends of the frame of the car are supported on the bolsters 14 of four-wheel trucks 15 of usual construction. The frame 11 of the car lies wholly inside the planes of the inner surfaces of the wheels of the running gear and the upper outer flanges 16 of the long I-beams 12 provided the rails of a narrow gauge track for supporting inwardly facing flanged wheels.

A semi-trailer, such as that shown in FIG. 1, is ordinarily provided with a so-called landing gear whose purpose is to provide means for supporting the trailer upright on a road when the trailer is detached from the tractor which supports one end of the trailer in travel on a road. The form of the landing gear of ordinary semi-trailers is shown in FIG. 3. It consists of two extensible and contractible telescoped legs 35 extending downwardly from the body or chassis of the vehicle. The lower end of each leg 35 ordinarily carries a T-shaped bearing piece 38 through which extends a shaft 39 on the ends of which are mounted two small wheels 36 called dolly wheels.

In accordance with my invention, and as shown in FIGS. 4 and 5, a hollow axle 20 extends between the two legs 35 of the landing gear and has its end portions mounted in the T-shaped pieces 38 of the legs. Most desirably the axle is secured in position by nuts 26 screwed on its ends so it constitutes a beam connecting the legs of the landing gear.

2

To avoid the danger of lateral twisting strains on the legs when the trailer is on the road, the two dolly wheels for each leg are mounted in tandem instead of in the usual side-by-side arrangement. For this purpose, triangular plates 21 have their middle portions mounted on the axle 20 at each end of each T-shaped piece 38. Each pair of plates 21 is connected at its outer corners by stub shafts 22 on which the usual dolly wheels 36 are rotatably mounted. It is apparent that in this arrangement a stone or other obstruction under one of the dolly wheels when they are lowered on the road will merely tip one pair of the plates 21 about the axle 20 without bringing any twisting strain on one of the legs 35 as would be the case if the wheels were mounted side-by-side in the usual manner.

In order to permit mounting the truck on a track provided by external flanges 16 along the upper side edges of the frame of the railway car, the small wheels or rollers 23 are rotatably mounted on the axle 20 and separated at the correct distance to engage the track rails 16. The rollers may be provided at their outer ends with flanges to guide them on the track rails 16, but, in order to save space, I find it more desirable to omit such flanges and to rely upon the inner two plates 21 to guide the rollers by engaging the outer edges of the track rails 16. This makes it possible to separate the two legs by a distance only slightly greater than the gauge of the track so that the rollers 23 may be placed close to the legs 35 and thus avoid any serious twisting strains on the legs.

Automatic means are provided for holding the rollers 23 down on the track rails 16. The hold-down elements have the form of plungers 24 slidably mounted in bearings 27 and 28 in the plates 21. Each plunger 24 has at its inner end a beveled projection 29 extending inwardly below one of the rollers 23 at sufficient distance to enable it to pass under the flange 16 which form the track rail on which the rollers are resting so as to slidably engage the lower side of the flange. Each plunger 24 is urged inwardly by a compression spring 25 so that its inner end normally extends under one of the rollers 23.

When the trailer has been placed on a railway car by means of a tractor and the tractor is about to be disengaged, the legs 35 are extended. In this operation, the inclined lower sides of the projections 29 of the plungers 24 strike the top surfaces of the flanges 16 of the railway car and are pushed outward by the cam actions of these inclined surfaces until they pass outside the outer edges of the flanges 16. The extension of the legs 35 is continued until the rollers 23 rest on the upper surfaces of the flanges 16. When, or just before, this occurs the inner ends of the plungers 24 move below the outer edges of the flanges 16 so that the springs 25 automatically push the plungers in until their ends are under the flanges 16, so that they may serve as hold-down elements for the rollers 23.

Means are provided for retracting the plungers 24 to permit disengagement of the rollers 23 from the track rails 16 when the trailer is to be removed from the railway car. The retracting means comprise a rod 42 extending inside the hollow axle 20 and connected to one of the plungers 24 by a lever 43 of the first class and to the other plunger 24 by a lever 44 of the second class. Fulcrums 45, 46 for the levers 43, 44 are provided on the two outer plates 21. It will be seen that the arrangement is such that, when either plunger 24 is drawn outwardly to bring its inner end clear of the flange 16, the rod 42 is moved to the right in FIG. 4 causing a similar outward movement of the other plunger 24. The plungers may be locked in their outer positions by engaging the notch 47 of either plunger with one of the outer plates 21. The legs 35 may then be contracted to raise the rollers 23 clear of the track rails 16, while the front end of the trailer is supported by a tractor which is to draw it off the railway car.

When the trailer is loaded on a railway car by means of a tractor which is provided with mechanism for raising and lowering the front end of the trailer, the lowering of the rollers 23 upon the track rails 16 and the raising of the rollers 23 from the track rails 16 may be effected without extending and contracting the legs 35. To facilitate such loading and unloading without manipulation of the legs 35, the dolly wheels 36 are placed with their lower surfaces below the lower surfaces of the rollers 23 by the same distance which separates the lower tangents of the rear road wheels of the trailer and the flanged wheels mounted on its rear axle. Thus the trailer is in a horizontal position both when its road wheels and dolly wheels rest on the ground and when its rear flanged wheels and rollers 23 rest on the tracks.

The landing gear which has been described adapts a trailer for use in the rail-and-road transportation systems described in pending application Serial No. 464,535, filed October 25, 1954, now abandoned, by Etienne DeGrandpre, and pending application Serial No. 499,461, filed April 5, 1955 now abandoned, by Etienne DeGrandpre, both of which are owned by the owner of this application. The new landing gear constitutes an improvement in that shown in application Serial No. 499,461 in that it avoids all twisting strains on the legs both when the landing gear is supported on a railway car and when it is supported on the ground. It also provides simple automatic and effective slidable holddown elements for the track wheels without requiring the provision of slides on the railway car.

While there has been described what is at present considered to be the preferred embodiment of the invention, it will be understood that various modifications may be made therein, and it is intended to cover in the appended claims all such modifications as fall within the true spirit and scope of the invention.

What I claim is:

1. The combination with the legs of a trailer landing gear, of a beam extending between the lower ends of the legs, a pair of wheels mounted on the beam between the legs, spring-pressed beveled-end plungers mounted on the beam and normally extending under the wheels to hold them down on a track, and means operable from either end of the beam for simultaneously withdrawing both plungers from their normal position in which their ends are under the wheels.

2. The combination with the legs of a trailer landing gear, of a hollow beam extending between the lower ends of the legs, a pair of wheels mounted on the beam between the legs, spring-pressed beveled-end plungers mounted on the beam and normally extending under the wheels to hold them down on a track, and means for simultaneously withdrawing both plungers from their normal position in which their ends are under the wheels, comprising a rod extending through the axle, a lever of the first class connecting one end of the rod to one of the plungers, and a lever of the second class connecting the other end of the rod to the other plunger.

3. A landing gear for a trailer comprising a pair of legs depending therefrom and arranged in laterally spaced-apart relation, a fixed axle extending laterally between the lower ends of said legs, a pair of laterally spaced-apart rollers rotatably mounted on said axle and adapted to engage the top surfaces of the respective rails of a cooperating longitudinally extending track, and a pair of laterally spaced-apart latches movably mounted upon said axle and respectively disposed outwardly of and below said rollers, said latches being spring-pressed inwardly to hook-under the respectively adjacent outer sides of the rails to prevent displacement of said rollers from the rails, said latches having beveled lower surfaces at the respective inner ends thereof so that said latches are adapted to be retracted through engagements thereof with the respectively adjacent top outer surfaces of the rails.

4. A landing gear for a trailer adapted for use in a rail-and-road transportation system and comprising a pair of legs depending from the trailer and arranged in laterally spaced-apart relation, a fixed beam extending laterally between the lower ends of said legs, a pair of laterally spaced-apart plates fixedly mounted on said beam and respectively disposed adjacent to the inner sides of said legs, a pair of laterally spaced-apart rollers rotatably supported by said beam and respectively disposed adjacent to the inner sides of said plates and adapted to engage the top surfaces of the respective rails of a cooperating longitudinally extending track, a pair of laterally spaced-apart front dolly wheels respectively rotatably mounted on the outer sides of said plates and arranged in front of said beam, and a pair of laterally spaced-apart rear dolly wheels respectively rotatably mounted on the outer sides of said plates and arranged in rear of said beam, said dolly wheels being disposed outwardly with respect to the adjacent outer surfaces of said rollers so as to prevent interference of said dolly wheels with the rails when they are respectively engaged by said rollers, the lower tangents of said dolly wheels being disposed below the lower tangents of said rollers so as to prevent interference of said rollers with a road engaged by said dolly wheels.

5. A landing gear for a trailer comprising a pair of legs depending therefrom and arranged in laterally spaced-apart relation, a fixed beam extending laterally between the lower ends of said legs, a pair of laterally spaced-apart guide members fixedly mounted on said beam and respectively disposed inwardly of the inner sides of said legs, a pair of laterally spaced-apart and rotatably mounted rollers carried by said beam and respectively disposed inwardly of the inner sides of said guide members and adapted to engage the top surfaces of the respective rails of a cooperating longitudinally extending track, said guide members being respectively disposed adjacent to the outer sides of the rails and in guiding relation therewith so as to guide said rollers on the rails, and a pair of laterally spaced-apart latches carried by said beam and respectively cooperating with the outer sides of the rails, said latches being selectively movable into latched and unlatched positions respectively holding and releasing the rails, said latches in their latched positions respectively under-hooking the adjacent outer sides of the rails to prevent displacement of said rollers from the rails.

6. The trailer landing gear set forth in claim 5, and further comprising manually operable means carried by said beam for selectively moving said latches between their latched and unlatched positions.

7. A landing gear for a trailer comprising a pair of legs depending therefrom and arranged in laterally spaced-apart relation, a fixed beam extending laterally between the lower ends of said legs, a pair of laterally spaced-apart guide members fixedly mounted on said beam and respectively disposed inwardly of the inner sides of said legs, a pair of laterally spaced-apart and rotatably mounted rollers carried by said beam and respectively disposed inwardly of the inner sides of said guide members and adapted to engage the top surfaces of the respective rails of a cooperating longitudinally extending track, said guide members being respectively disposed adjacent to the outer sides of the rails and the lower edges of said guide members projecting below the lower tangents of said rollers so that said guide members respectively cooperate with the outer sides of said rails to guide said rollers thereon, a pair of laterally spaced-apart latches carried by said beam and respectively cooperating with the outer sides of the rails, said latches being selectively movable into latched and unlatched positions respectively holding and releasing the rails, said latches in their latched positions respectively under-hooking the adjacent outer sides of the rails to prevent displacement of said rollers from the rails, and a pair of laterally spaced-apart and rotatably mounted dolly wheels carried by said beam and respectively disposed outwardly of said guide members, the lower tangents of said dolly wheels being disposed below the lower edges of said guide members so as to prevent interference by said guide members with a road engaged by said dolly wheels.

8. A landing gear for a trailer comprising a pair of legs depending therefrom and arranged in laterally spaced-apart relation, a fixed hollow beam extending laterally between the lower ends of said legs, a pair of laterally spaced-apart and rotatably mounted rollers carried by said beam and respectively disposed inwardly of the inner sides of said legs and adapted to engage the top surfaces of the respective rails of a cooperating longitudinally extending track, a pair of laterally spaced-apart latches carried by said beam and respectively cooperating with the outer sides of the rails, said latches being selectively movable into latched and unlatched positions respectively holding and releasing the rails, said latches in their latched positions respectively under-hooking the adjacent outer sides of the rails to prevent displacement of said rollers from the rails, and mechanism housed within said hollow beam and manually operable from either end thereof for selectively moving said latches between their latched and unlatched positions.

9. A landing gear for a trailer comprising a pair of legs depending therefrom and arranged in laterally spaced-apart relation, a fixed beam extending laterally between the lower ends of said legs, a pair of laterally spaced-apart and rotatably mounted rollers carried by said beam and respectively disposed inwardly of the inner sides of said legs and adapted to engage the top surfaces of the respective rails of a cooperating longitudinally extending track, a pair of laterally spaced-apart latches carried by said beams and respectively cooperating with the outer sides of the rails, said latches being selectively movable into latched and unlatched positions respectively holding and releasing the rails, said latches in their latched positions respectively under-hooking the adjacent outer sides of the rails to prevent displacement of said rollers from the rails, and a pair of laterally spaced-apart and rotatably mounted dolly wheels carried by said beam and respectively disposed outwardly of the outer sides of said legs, the lower tangents of said dolly wheels being disposed below the lower tangents of said rollers and below the lower extremities of said latches so as to prevent interference by said rollers and by said latches with a road engaged by said dolly wheels.

References Cited in the file of this patent

UNITED STATES PATENTS

| | | |
|---|---|---|
| 1,110,655 | Spelling | Sept. 15, 1914 |
| 1,289,653 | Castano | Dec. 31, 1918 |
| 1,891,517 | Williams | Dec. 20, 1932 |
| 2,400,652 | Morris | May 21, 1946 |
| 2,413,761 | Groover | Jan. 7, 1947 |
| 2,417,619 | Seyferth | Mar. 18, 1947 |
| 2,458,312 | Stephen | Jan. 4, 1949 |
| 2,579,180 | Eldred | Dec. 18, 1951 |
| 2,839,012 | Gutridge | June 17, 1958 |

FOREIGN PATENTS

| | | |
|---|---|---|
| 501,003 | Belgium | Feb. 28, 1951 |
| 997,887 | France | Sept. 19, 1951 |
| 1,036,260 | France | Apr. 23, 1953 |
| 388,168 | Great Britain | Feb. 23, 1933 |
| 688,088 | Great Britain | Feb. 25, 1957 |

OTHER REFERENCES

Publication: Railway Age, pages 45–47, March 7, 1955.